No. 888,278. PATENTED MAY 19, 1908.
E. M. WALLACE.
BROODER.
APPLICATION FILED MAR. 1, 1907.

2 SHEETS—SHEET 1.

Inventor
E. M. Wallace

Witnesses
G. R. Thomas
M. J. Miller

By Chandler & Chandler
Attorneys

No. 888,278. PATENTED MAY 19, 1908.
E. M. WALLACE.
BROODER.
APPLICATION FILED MAR. 1, 1907.
2 SHEETS—SHEET 2.
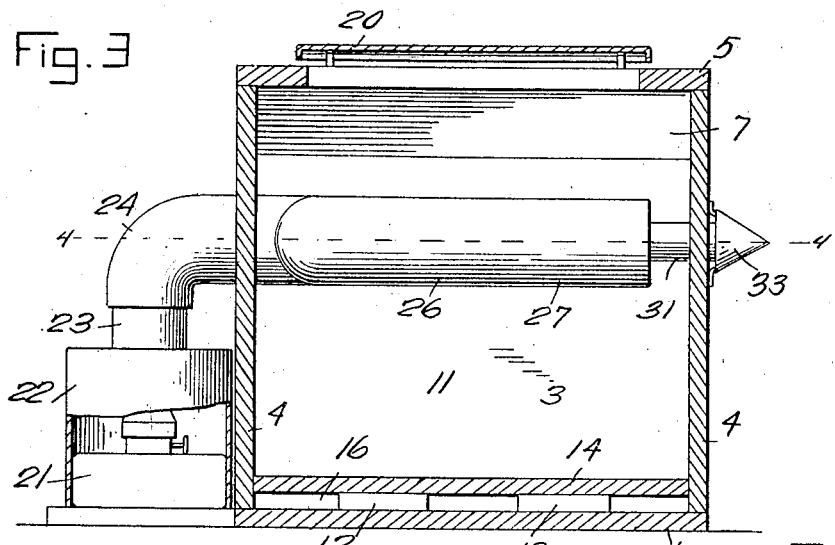
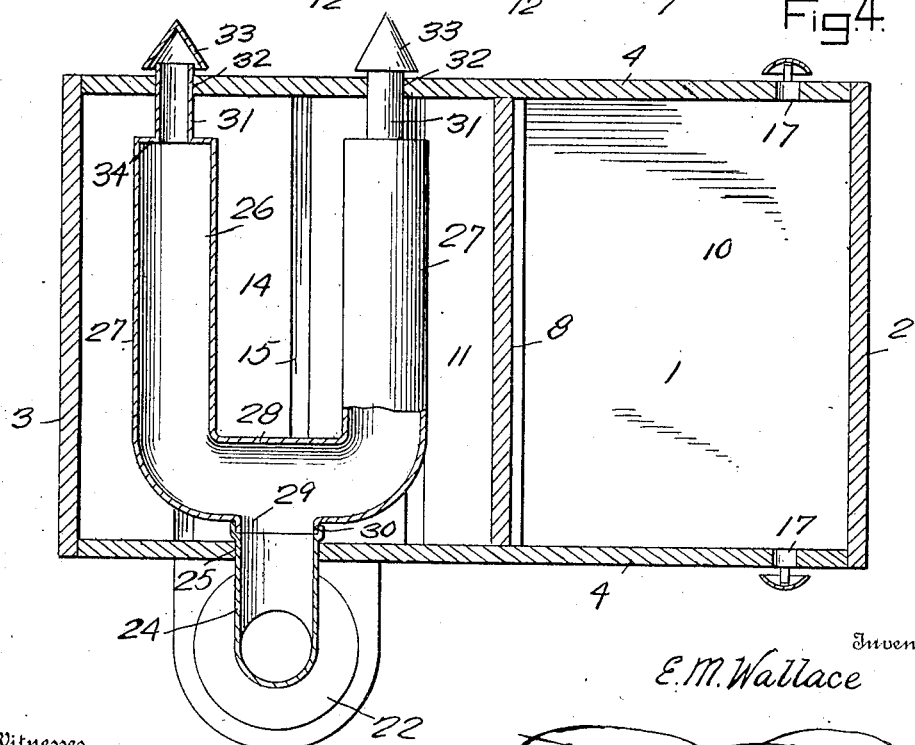

UNITED STATES PATENT OFFICE.

ERNEST M. WALLACE, OF ST. JOSEPH, MISSOURI.

BROODER.

No. 888,278.   Specification of Letters Patent.   Patented May 19, 1908.

Application filed March 1, 1907. Serial No. 360,031.

*To all whom it may concern:*

Be it known that I, ERNEST M. WALLACE, a citizen of the United States, residing at St. Joseph, in the county of Buchanan, State of Missouri, have invented certain new and useful Improvements in Brooders; and I do hereby declare the following to be a full, clear, and exact description of the invention, such as will enable others skilled in the art to which it appertains to make and use the same.

This invention relates to new and useful improvements in brooders, and it has for its object to provide a brooder involving novel ventilating and heat-retaining means.

The invention aims as a further object to provide novel means for preventing the circulation of direct cold air drafts into the heating chamber.

Figure 1:
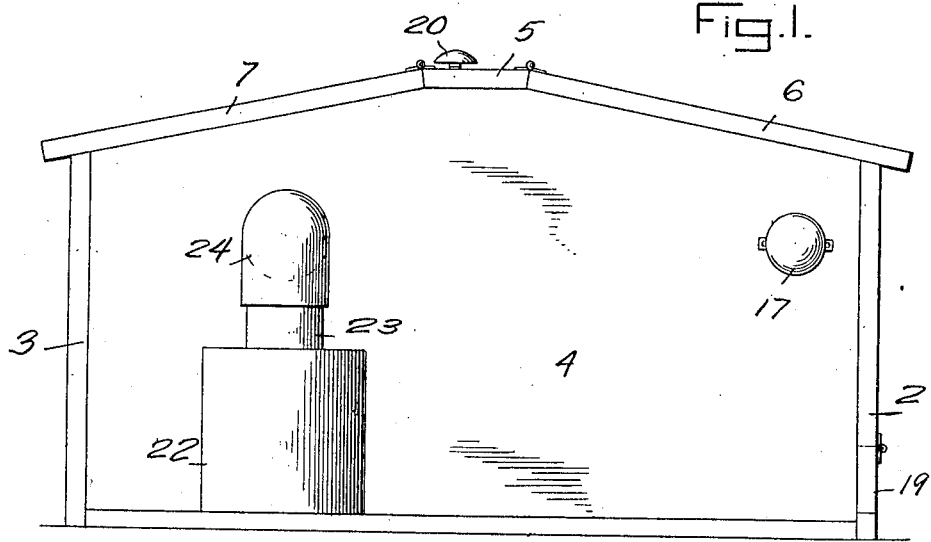
Figure 2:
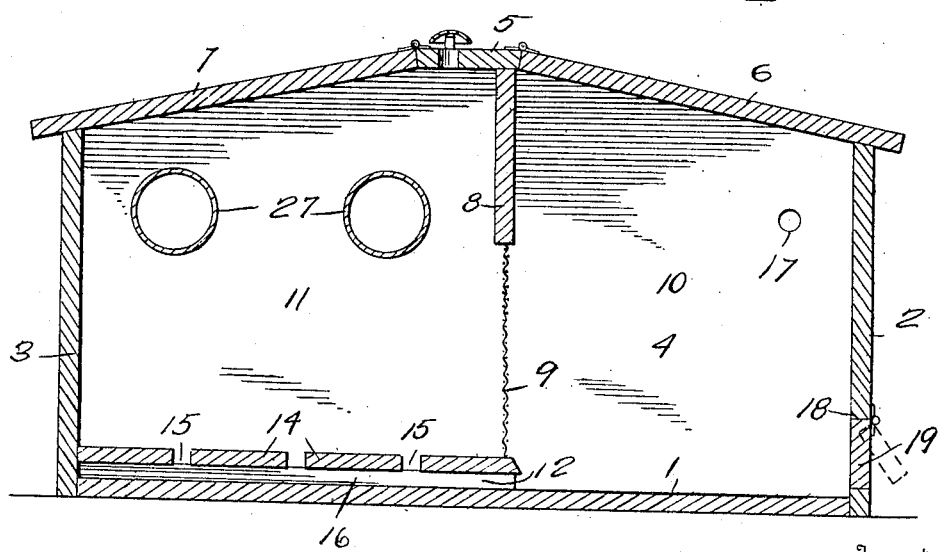

The invention aims as a further object to provide a novel combination, construction and arrangement of parts, the details of which will appear in the course of the following description, in which reference is had to the accompanying drawings forming a part of this specification, like characters of reference designating similar parts throughout the several views, wherein Figure 1 is a side elevation of a brooder constructed in accordance with the invention embodied in the present application. Fig. 2 is a central longitudinal section thereof. Fig. 3 is a central transverse section thereof. Fig. 4 is a section on the line 4—4 of Fig. 3.

The invention in its practical embodiment comprises a casing including a bottom 1, constituting a floor, end walls 2 and 3, side walls 4, a fixed bar 5, extending transversely across the top of said side walls centrally thereof, and covers 6 and 7 hinged to said bar 5, and designed to close upon the side and end walls. Depending from the bar 5 longitudinally thereof is a transverse bar 8, extending downwardly about two-fifths of the depth of the casing, and having fixed to its lower end a depending curtain 9, of flexible material, preferably textile. The bar 8 and curtain 9 conjointly constitute a partition, in which function they divide the casing into an exercising chamber 10, closed by the cover 6 and into a heating chamber 11 closed by the cover 7. At the ends of the chamber 11 are arranged cleats 12, which afford supports for a floor, the latter being constituted of transverse slats 14, having spaces 15 therebetween, and likewise spaced away from the bottom 1.

The cleats 12 are spaced away from the sides of the casing in such a manner that communication is had between the chamber 10 and the space 16 occurring between the slots 14 and the bottom 1, so that the cold air admitted into the exercising chamber 10 first passes through the spaces between the cleats 12 and between said cleats and the side walls 4, into the chamber 16. Such cold air is admitted into the chamber 10 through ventilators 17 of conventional form provided in the side walls 4. At the base of the end wall 2, which likewise constitutes the end wall of the chamber 10, an opening 18 is provided, through which the fowls pass into and out of said chamber, said opening being normally closed by a hinged door 19. An air-exhaust ventilator 20 is mounted in the bar 5 and communicates with the chamber 11.

The heating means comprises a lamp 21, arranged exteriorly of the chamber 11, and adapted for kerosene, the lamp 21 being of the conventional form usually employed in the art. The lamp 21 is surrounded by a spaced hood 22, embodying a vertical pipe section 23, which is coupled to an elbow joint 24 projected snugly through an opening 25 provided therefor in the side wall 4 adjacent the joint 24. A heat-radiating pipe 26 is arranged within the chamber 11, and comprises parallel conductors 27 and a transverse connection 28, provided centrally thereof with an opening 29 and with a flange or thimble 30, circumscribing said opening, and having connection with the inner end of the elbow 24. The conductors 27, at their free ends, are provided with reduced concentric portions 31, which are projected snugly through openings 32 in the adjacent side wall 4. Air-guards 33 span said openings 32, and the open end of said conductors 27 exteriorly of the casing, and serve to prevent the entrance of cold air into the radiating pipe, which would tend to lower the temperature of the chamber 11, and to affect the flame from the lamp 21.

The provision of the reduced end portions 31 of the conductors 27 affords shoulders 34, which serve to prevent the too rapid escape of air from said conductors and to retain the heated air therein a sufficient length of time for its proper action upon the surrounding air of the chamber 11.

From the foregoing description, it will be seen that simple and efficient means are provided for accomplishing the objects of the invention, but while the elements herein shown and described are well adapted to serve the functions set forth, it is obvious that various minor changes may be made in the proportions, shape and arrangement of the several parts, without departing from the spirit and scope of my invention as defined in the appended claims.

What is claimed, is—

In a brooder, a casing, a depending partition therein terminating short of the floor thereof, and carrying a flexible curtain, said partition dividing said casing into exercising and heating chambers, cleats having spaces therebetween affording communication between said chambers; a floor constituted of transverse spaced slats supported on said cleats, a heating pipe within said heating chamber, a source of heat supply communicating with said heating pipe, and air draft openings provided in said casing.

In testimony whereof, I affix my signature, in presence of two witnesses.

ERNEST M. WALLACE.

Witnesses:
J. A. McIntyre,
J. O. Knight.